United States Patent
Schneider

[15] 3,649,878
[45] Mar. 14, 1972

[54] NON-POLAR SOLID ELECTROLYTIC CAPACITOR

[72] Inventor: Herman Schneider, Phoenix, Ariz.
[73] Assignee: Components, Incorporated
[22] Filed: July 23, 1970
[21] Appl. No.: 57,475

[52] U.S. Cl. .................................317/230, 317/233, 29/570
[51] Int. Cl. ....................................................H01g 9/05
[58] Field of Search .................................317/230, 231, 233

[56] References Cited

UNITED STATES PATENTS

| | | |
|---|---|---|
| 3,066,247 | 11/1962 | Robinson.................................317/230 |
| 3,115,596 | 12/1963 | Fritsch.....................................317/230 |
| 3,146,383 | 8/1964 | Runtz et al...............................317/230 |
| 3,345,543 | 10/1967 | Sato.........................................317/230 |
| 3,349,294 | 10/1967 | Heinimann et al.......................317/230 |
| 3,491,270 | 1/1970 | Gabriel....................................317/230 |
| 3,498,861 | 3/1970 | Namikata et al.....................317/230 X |
| 3,516,150 | 6/1970 | Leech..................................317/230 X |

*Primary Examiner*—James D. Kallam
*Attorney*—Rosen & Steinhilper

[57] ABSTRACT

A nonpolar solid electrolytic capacitor comprises two facing electrodes of film-forming metal having a dielectric film on the surface thereof and a semiconductive oxide covering the dielectric film and positioned between the electrodes. The electrodes may be of tantalum or similar film-forming metals. The dielectric may be an oxide of the metal and the semiconductor may be manganese dioxide, lead oxide or similar metal. The method of preparation is described.

1 Claim, 6 Drawing Figures

PATENTED MAR 14 1972

3,649,878

HERMAN SCHNEIDER
INVENTORS

BY ROSEN & STEINHILBER

ATTORNEYS

NONPOLAR SOLID ELECTROLYTIC CAPACITOR

BACKGROUND OF THE INVENTION

Solid electrolytic capacitors have been known for many years, but within the past decade or so have come into increasing popularity. For example, Ruben U.S. Pat. No. 1,678,824 is believed to be the first to describe the solid electrolytic capacitor although his design was used primarily as a rectifier. More recently, Haring, et al., U.S. Pat. No. 3,166,693 and U.S. Pat. No. 3,093,833 and Robinson U.S. Pat. No. 3,066,247 and Millard U.S. Pat. No. 2,936,514 disclosed solid electrolytic capacitors of the type which have become common in the capacitor industry. These capacitors generally have found commercial success with tantalum as a film-forming metal electrode, usually in sintered pellet form, although other film-forming metals such as aluminum, zirconium, columbium, hafnium, titanium and tungsten can be used.

The usual solid tantalum capacitor now commercially successful in the capacitor industry is prepared from a sintered tantalum pellet. Generally speaking, the pellet is anodized to form a dielectric tantalum oxide film on the tantalum particles. It is then impregnated with a solution of a manganese salt and is pyrolized to form manganese dioxide within the pellet. The anodization and the manganese dioxide formation are usually repeated to form a continuous oxide film and a satisfactory semiconductor body within the pellet.

The resulting commercial solid tantalum capacitor has many advantages in electronic circuitry and particularly in miniaturized circuitry. These solid capacitors have relatively low cost and extremely small volume per unit of capacitance and can be manufactured on a production basis. They are generally mechanically extremely strong and durable and produce reliable results under a wide variety of electrical and environmental conditions.

Although the solid tantalum capacitors have these many advantages, they nevertheless suffer from a serious limitation in that they are polar rather than non-polar capacitors. Not only must they be installed with care to be sure that the correct lead is employed as the cathode and the correct lead employed as the anode, but in addition, they must be used in circuitry where there is never a reversal of polarity. This, necessarily, imposes limits on the use and flexibility of use of these products.

GENERAL NATURE OF THE INVENTION

Accordingly, the present invention relates to a non-polar solid electrolytic capacitor and to methods for manufacturing such capacitors. The capacitor of the present invention generally comprises a plurality of electrodes in planar configuration positioned closely face to face, having a dielectric film over the entire surface of each of the electrodes and having a layer of semiconductive oxide covering the dielectric surface and positioned between the two electrodes.

It is an object of the invention to provide a novel non-polar solid electrolytic capacitor.

Another object of the invention is to provide an improved miniature, solid electrolytic capacitor suitable for use in transistorized circuitry, which capacitor is of a quality equal to or superior than that of capacitors of substantially larger physical size heretofore available.

Another object of the invention is to provide an improved method of manufacturing capacitors which employ solid electrolytes.

In accordance with the principles of the invention, a capacitor is formed from two thin plane anode structures of a suitable film-forming material. The anode structures may be formed in a variety of configurations, for example, a flat coil of wire, a solid plate or a sintered pellet of compressed particles. A lead element of the same material is associated with each anode. It is preferred that the anode have a thickness of not more than 0.060 inches which enables controlled and improved uniformity in the pellet density, and substantially improves the high frequency characteristics of the capacitor by reducing the length of the conductance path. In the manufacturing operation, the anodes and leads are purified in a high temperature, high vacuum environment to an extremely high purity and then the metal oxide dielectric film is formed in an anodizing operation. A plurality of sets of the anodized thin plane electrodes next are positioned in suitable spaced relationship (only a few thousandths of an inch between the adjacent faces of the two anodes in each set) and are subjected to treatment which forms a semiconductor electrolyte on their surfaces that functions as the conducting element connecting the two adjacent dielectric films. This insures the existence of the desired potential gradient across the plates of the non-polar capacitor. In the preferred embodiment of the invention, manganous nitrate is applied to the anodized plates and is pyrolytically decomposed in a manner that insures that the anode metal and the resulting manganese dioxide electrolyte are not in contact. The anodizing and pyrolytic decomposition steps are repeated if necessary to heal imperfections in the dielectric films and when the capacitors have the desired electrical characteristics, each capacitor structure is then enclosed in a suitable casing which preferably includes a layer of moisture impervious material such as silicon rubber immediately adjacent the semiconductive layer, a rigid encapsulation material such as an epoxy resin and a heat shrinkable Mylar (polyethylene terethalate resin) tube. The Mylar tube shrinks about the capacitor assembly during the curing of the epoxy resin and thus provides a compact attractively packaged capacitor unit of outstanding electrical properties. Capacitors constructed in accordance with principles of the invention are rated to have maximum leakage currents of 0.5 microamperes at rated voltage and have excellent dissipation factors and capacitance temperature characteristics. They are capable of reliable operation over a substantial frequency range up to several megacycles. Illustrative of the small size of these capacitors is the fact that a non-polar capacitor constructed in accordance with the invention and having a rating of 0.047 microfarads has dimensions of 0.150 ×0.115 inches. The invention thus provides improved miniature capacitor components which are stable over a wide range of environmental conditions.

Other objects, features, and advantages of the invention will be seen as the following description of preferred embodiments thereof progresses in conjunction with the drawings, in which.

Figure 1:
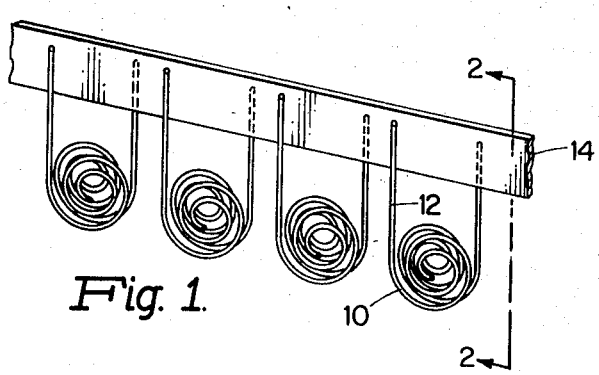
FIG. 1 is a perspective diagrammatic view of an initial assembly of four sets of anodes preparatory to the application of the solid electrolyte in the manufacture of a non-polar capacitor according to the principles of the invention.
Figure 2:
FIG. 2 is a sectional view taken along the line 2—2 of FIG. 1 illustrating the relationship of the anodes in the assembly of FIG. 1.

With reference to FIG. 1, there are shown four pairs of flat coils 10 of tantalum wire, each coil of which forms a thin plane anode electrode structure and has a lead portion 12 extending upwardly from the anode plane. The lead portions 12 are secured to a spacer 14 by clamping, welding or other suitable means so that the anode planes are aligned with each other with the adjacent faces of each set in close proximity to one another. A typical thickness of the spacer 14 is 0.005 inches. The tantalum is formed in the coil to provide surface area sufficient to obtain the desired capacitance value. The anodes and leads were initially treated in a high temperature, high vacuum furnace (at 2400° C. with a vacuum in the range of $10^{-6}$–$10^{-8}$ mmHg) to remove any contaminants which may be on their surface so that the resultant surface purity is in excess of 99.999 percent. The anodes of each pair, positioned in parallel relationship, are maintained in that relationship throughout the several manufacturing steps.

The several anodes, together with a short portion of the lead wire 12 of each, are then immersed in an electrolyte solution which normally is an aqueous solution. A suitable electrolyte is a half of 1 percent nitric acid solution maintained at 70° C., with a sheet of tantalum immersed in the solution functioning as a suitable cathode. The anodes are then brought to the desired potential as applied through the lead wires for approximately 60 minutes to electrolytically form a dielectric film 16 of tantalum oxide. Film formation is conducted in accordance with established electrolytic practice until the desired thickness and leakage current characteristics have been obtained (the ultimate thickness being proportional to the formation voltage). A suitable method is to apply the selected potential until the leakage current drops to a predetermined minimum, which may, for example, be in the order of 3 microamperes.

After formation of the oxide film the anode plates are removed from the liquid electrolyte and are immersed in an aqueous solution of manganous nitrate for 5 minutes. The solution is washed off the lead portions 12 or the structures are otherwise suitably treated to insure that no manganous nitrate solution remains on the lead portions. The manganous nitrate solution on each anode is then pyrolytically treated by instantaneously exposing the cold anode covered with manganous nitrate to an ambient temperature controlled between 850° and 1,000° F. The water in the manganous nitrate solution is rapidly driven off and decomposition begins at approximately 200° C. A phase of gray manganese oxide is then produced which upon approaching the ambient temperature becomes black manganese dioxide having the desired electrical and physical properties. The time required to reach the black phase is determined visually and ranges between 20 seconds and 2 minutes. As this technique produces a cathode layer which is too thin to have the desired mechanical and physical properties the partially coated anode plates are subjected to three to five additional immersions in aqueous manganous nitrate, each immersion being followed by a pyrolytic conversion.

During the initial pyrolytic conversion operation, which involves the production of certain corrosive gaseous products as well as thermal shock, minute openings may be produced in the dielectric film, exposing the surface of the anodes. Under such circumstances a partial or full repeat operation may be performed, in which the anodes are placed in other electrolyte solution and anodized again in a higher working voltage. An 0.025 percent acetic acid solution having a conductivity between 8,000 and 9,500 ohm centimeters is suitable for this purpose. The series of operations, including the repeat operation, may be repeated again and again as necessary. The non-polar capacitor, formed of the two anodes is completed at this stage, with an integral manganese dioxide layer formed between the two anodes. The formation of an adequate semiconductor oxide layer is not impeded even when the two anodes are actually in initial physical contact.

Figure 3:
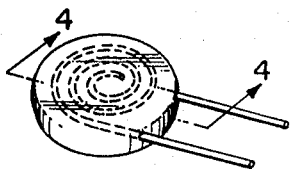
FIG. 3 is a perspective view of the assembled non-polar capacitor in completed form.
Figure 4:
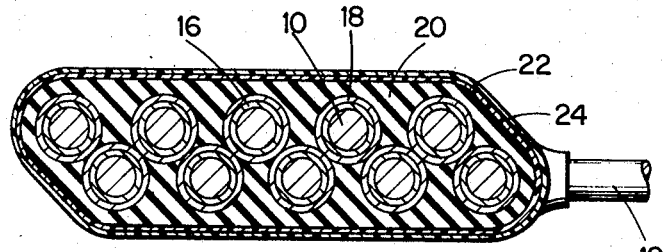
FIG. 4 is an enlarged sectional view of the non-polar capacitor taken along the line 4—4 of FIG. 3.

The components may then be coated with a moisture proof barrier material 20 such as a silicon rubber and a coating 22 of epoxy resin or other material which accords substantial mechanical strength and protection to the component. As the application of manganese dioxide over the lead area has been carefully controlled only the metal oxide dielectric extends through the protective epoxy body and the manganese dioxide coating is not subjected to mechanical stress at this point. A second layer of epoxy resin may be applied to the assembly and a tube 24 of heat shrinkable Mylar film is slid over the second epoxy resin layer. As a final step, the epoxy resin is cured in an exothermic operation which simultaneously causes the Mylar tube to shrink about the capacitor and provide a tight compact enclosure having excellent mechanical and electrical characteristics. The finished unit shown in FIG. 3 has a typical capacitance value of 0.0022 microfarads with a major dimension of 0.100 inches and has a resistance of 5,000 megohms. Non-polar capacitors manufactured in accordance with the invention having capacitance values in the range of 0.001 to 0.047 microfarads have been manufactured on a mass production basis.

Figure 5:
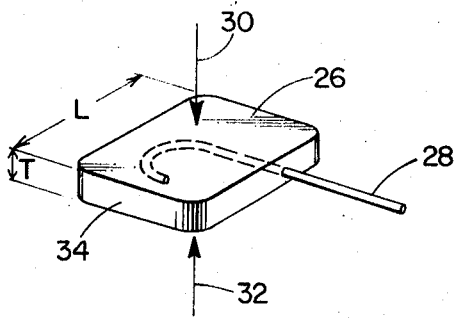
FIG. 5 illustrates the shape and method of forming the configuration and method of forming a sintered pellet anode suitable for use in solid electrolytic capacitors constructed in accordance with principles of the invention.
Figure 6:
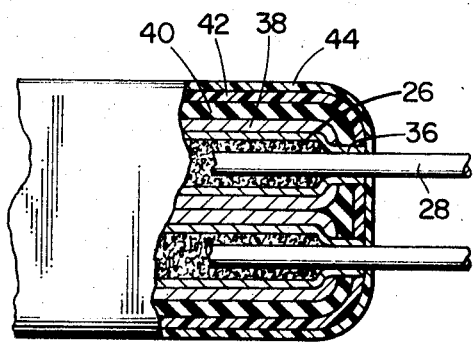
FIG. 6 is a sectional view through a portion of a non-polar solid electrolytic capacitor employing sintered pellet anodes.

A second form of non-polar capacitor is shown in FIGS. 5 and 6. The tantalum anodes in this embodiment are in the form of pellets of compressed sintered particles bonded into a rigid porous mass. Each pellet anode 26 has a solid tantalum lead wire 28 incorporated in and bonded to it during a sintering operation. It is preferred that the thickness of these plane structures not be in excess of 0.060 inches and the anode structures have a ratio of the length, or diameter, to thickness between 3/1 to 14/1. The pellet is formed by compressive forces exerted perpendicularly to the large planar surface 30 as indicated by the arrows 32 in FIG. 5 with a suitable enclosure arranged to define the wall portions 34 between the planar surfaces 30 by forming the pellets with high pressure which may, for example, be in the order of 1,000 p.s.i. and which is evenly distributed over the comparatively large planar surfaces. It has been found that this pellet configuration enables a more uniform density and high purity of the pellet to be obtained with a resulting improved capacitor. In addition, this pellet configuration produces improved frequency characteristics for the resulting capacitor as the length of the conductance path within the anode is minimized. After sintering, the pellets are anodized to form the tantalum oxide film 36 which is shown as extending along the leads in FIG. 6. While the tantalum oxide film 36 has been shown as extending over the surface of the pellet and having substantial thickness, it will be understood that the film in actuality is a relatively thin film which is formed on the exposed surfaces of the tantalum particles and also extends along the leads 28. The manganese dioxide semiconductor layer 38 is formed over the dielectric film, care being taken to insure that a substantial length of the dielectric film on the leads remains not covered by manganese dioxide as indicated in FIG. 6. When the desired capacitor characteristics of the capacitor have been achieved, the assembly is suitably encapsulated with a moisture proof barrier 40, a layer 42 of epoxy resin for example, affording mechanical strength and a suitable enclosing film 44. Other enclosures may of course be utilized such as ceramic materials or glass and through the use of such enclosures, the operative temperature range of this capacitor may be extended up to the vicinity of +500° C.

Thus, it will be seen that the invention provides a novel and improved solid electrolytic capacitor which is particularly suited for use with microminiaturized circuitry. The capacitors constructed in accordance with the invention have extremely high capacitance values per unit volume and have excellent temperature and frequency range characteristics. The methods of the invention enable the capacitors to be produced economically and in mass production quantities. It is clear that certain modifications of the disclosed embodiment will be obvious to those skilled in the art. Therefore, while preferred embodiments of the invention have been shown and described it is not intended that the invention be limited thereto or to details thereof and departures may be made therefrom within the spirit and scope of the invention as defined in the claims.

I claim:

1. A non-polar solid electrolytic capacitor comprising: two juxtaposed electrodes, each comprising a wire composed of an electrically conductive film-forming metal wound in a spiral planar coil; a dielectric film on each electrode comprising an oxide of the electrode metal; a layer of a semiconductive material covering said dielectric film on each electrode and being positioned between said electrodes; and means for encapsulating said electrodes.

* * * * *